(No Model.)
G. W. PEARSONS.
PRESSURE REGULATING VALVE.
No. 297,441. Patented Apr. 22, 1884.
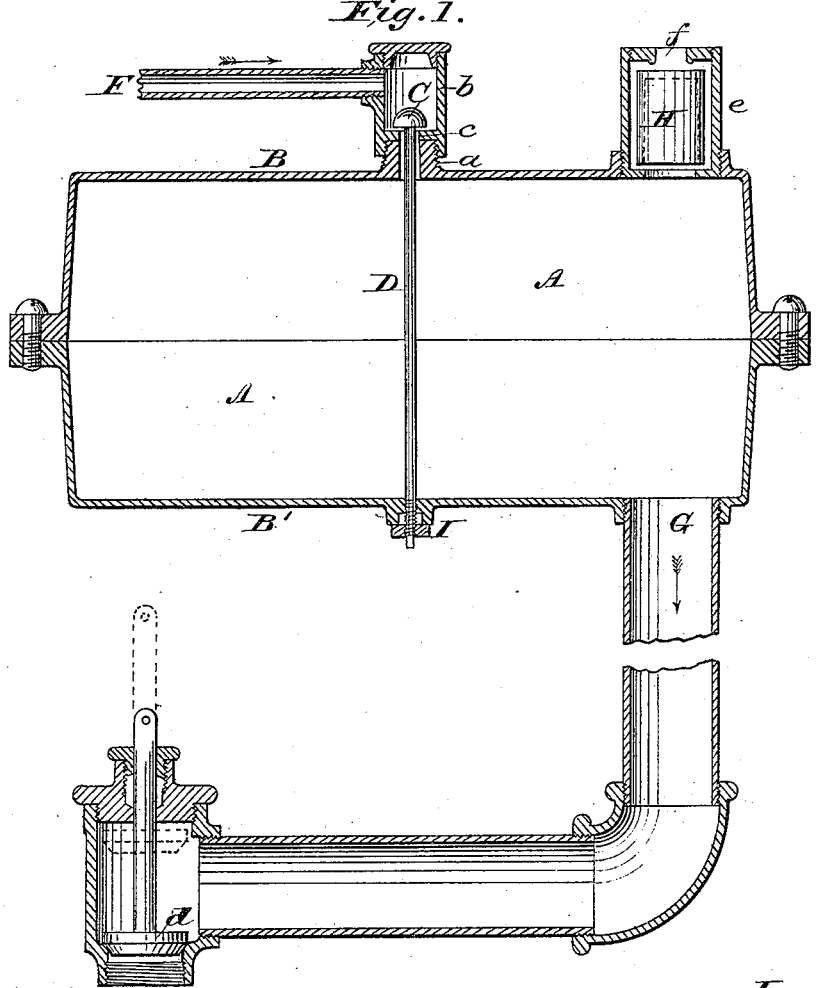
Witnesses:
T. E. Brecht
Lee Riley
Inventor:
Galen W. Pearsons,
By E. H. Guisabaugh
Attorney.

UNITED STATES PATENT OFFICE.

GALEN W. PEARSONS, OF KANSAS CITY, MISSOURI.

PRESSURE-REGULATING VALVE.

SPECIFICATION forming part of Letters Patent No. 297,441, dated April 22, 1884.

Application filed October 25, 1883. (No model.)

*To all whom it may concern:*

Be it known that I, GALEN W. PEARSONS, a citizen of the United States, residing at Kansas City, in the county of Jackson and State of Missouri, have invented certain new and useful Improvements in Check-Valves, of which the following is a specification, reference being had therein to the accompanying drawing.

My invention relates to improvements in check-valves for regulating the flow of water, &c., for water-closets and other purposes.

My invention consists of a chamber the walls of which are connected centrally by a bolt, one end of said bolt being secured in the lower or outer wall of the chamber, while the other end is provided with a head, which is seated within the supply-pipe, whereby when the wall or walls of the chamber are expanded or bulged outward by the pressure of the liquids or gases the head of the bolt will act as a valve to close the opening in the supply-pipe.

My invention consists, further, in certain details of construction, which will be fully described hereinafter, and pointed out in the claim.

Referring to the drawing, the figure is a longitudinal sectional view of my device.

I will describe the principle and operation of my device, as shown in the drawing, and as applicable to the flushing of water-closets.

A is the pressure or storage chamber, which may be circular, cylindrical, rectangular, or of any suitable or desirable shape, made of iron or other suitable metal, having the ends or sides B B' made elastic, so that they will be slightly bulged or distended when subjected to internal pressure, but will assume their normal or original position when relieved of such pressure. The end or side B of the chamber is provided with a central threaded opening, $a$, to which is secured the coupling $b$, with which the inlet or main-supply pipe F is connected. The coupling $b$ is provided with a valve-seat, $c$, in which is seated the valve C, said valve being connected to a stem, D, which passes through the chamber A, and is secured in or to the head B' of the chamber in such a manner that when the walls B and B' are bulged or distended by the pressure of the liquids or gases within the chamber A the valve C will be drawn down into its seat $c$, and the flow of water or other liquid into the chamber A will be shut off.

To one side of the wall B' is secured an outlet-pipe, G, in which is seated an ordinary flushing-valve, $d$, which, when raised or opened, permits the water to flow from the chamber A, and relieves the walls of the chamber from outward pressure, and permits them to contract or assume their normal position, which opens the inlet to the main supply-pipe. When the valve $d$ is closed, the chamber A is filled with water or other liquid until the walls of the chamber are bulged outward or distended, and the supply cut off, in the manner already indicated.

H is an ordinary float-valve seated in the extension $e$ of the side B, which permits the ingress and egress of air, to allow the chamber A to be readily filled and emptied of its contents. When the chamber A is filled, the float H will be elevated to close the opening $f$ in the extension $e$, and cause the pressure of water to be confined in the chamber A, and to bulge or distend its walls, as before stated.

A stand-pipe may be used instead of the float-valve.

It will be observed that the valve C closes in the direction of the flow of the liquid and against the pressure of the sides B B'. The area of the sides B B' being so much in excess of the area of the valve C, a slight decrease in the pressure in the chamber A is sufficient to open the valve C against a heavy head or pressure of liquid or gas in the pipe F. The stem D, on which the valve C is mounted, is screwed through the side or head B', and secured by the jam-nut I, by which means the extent of expansion or bulge of the sides or ends B B' can be adjusted to meet the requirements of any pressure; and this adjustment can be made while the device is in operation.

Instead of a closed chamber, A, as shown, an open tank may be used, the valve-stem D being attached to the bottom of the tank, the bottom of the tank being so constructed as to permit it to bulge or be distended when a certain amount of water has run into the tank, and thus hold the valve C down into its seat and arrest the further inflow of water or other liquid.

The devices in this application relating to pressure-regulators, which have been erased by amendment of February 10, 1884, are hereby reserved to form the subject-matter of a future application for Letters Patent.

Having thus described my invention, what I claim, and desire to secure by Letters Patent, is—

In a device for regulating the flow of liquids, the combination of the chamber A, having flexible walls and valve-operating devices, substantially such as described, connected thereto, with the float-valve H, outlet-pipe G, and valve d, as and for the purpose set forth.

In testimony whereof I affix my signature in presence of two witnesses.

GALEN W. PEARSONS.

Witnesses:
M. G. RILEY,
LEE RILEY.